United States Patent
Bi et al.

(10) Patent No.: US 11,652,968 B1
(45) Date of Patent: May 16, 2023

(54) METHOD FOR IMPLEMENTING SYNCHRONOUS RISING, FALLING, OR TRANSLATION OF PROJECTION IMAGE ALONG WITH ROLLABLE SCREEN

(71) Applicant: JIANGSU SHUNHE INTERNET OF THINGS TECHNOLOGY CO., LTD., Hai'an (CN)

(72) Inventors: Chunguang Bi, Hai'an (CN); Yuehua Shi, Hai'an (CN)

(73) Assignee: JIANGSU SHUNHE INTERNET OF THINGS TECHNOLOGY CO., LTD., Hai'an (CN)

( * ) Notice: Subject to any disclaimer, the term of this patent is extended or adjusted under 35 U.S.C. 154(b) by 0 days.

(21) Appl. No.: 17/924,689

(22) PCT Filed: Sep. 10, 2020

(86) PCT No.: PCT/CN2020/114413
§ 371 (c)(1),
(2) Date: Nov. 11, 2022

(87) PCT Pub. No.: WO2021/227316
PCT Pub. Date: Nov. 18, 2021

(30) Foreign Application Priority Data

May 11, 2020 (CN) .......................... 202010392984.8

(51) Int. Cl.
*H04N 9/31* (2006.01)
*G03B 21/58* (2014.01)

(52) U.S. Cl.
CPC ........... *H04N 9/3188* (2013.01); *G03B 21/58* (2013.01)

(58) Field of Classification Search
CPC ...... H04N 9/3185; H04N 9/3188; H04N 9/31; H04N 9/3179; G03B 21/58
(Continued)

(56) References Cited

U.S. PATENT DOCUMENTS

| 10,613,427 B2 | 4/2020 | Seki et al. |
| 2015/0256803 A1* | 9/2015 | Alhazme ................ G03B 21/56 |
| | | 348/746 |

FOREIGN PATENT DOCUMENTS

| CN | 203658723 U | 6/2014 |
| CN | 105425524 A | 3/2016 |

(Continued)

*Primary Examiner* — Sherrie Hsia
(74) *Attorney, Agent, or Firm* — Bayramoglu Law Offices LLC

(57) ABSTRACT

A method for implementing a synchronous rising, falling, or translation of a projection image along with the movement of a rollable screen is provided. After a system is powered on and started, a projection screen first reports a current position of a screen to a project host via a communication link. The projection host performs a preprocessing on a projection image according to the current screen position n0 obtained from the projection screen and an image is projected onto the projection screen. The projection host informs the projection screen via the communication link and confirms that the current projection image is aligned according to the current position of the projection screen. After the projection screen obtains confirmation information from the projection host, the projection screen is driven to reach the next position, and the projection host obtains the next specific position of the projection screen via the communication link.

6 Claims, 3 Drawing Sheets

(58) Field of Classification Search
USPC .................................................. 348/744–747
See application file for complete search history.

(56) References Cited

FOREIGN PATENT DOCUMENTS

| | | |
|---|---|---|
| CN | 107896323 A | 4/2018 |
| CN | 110572629 A | 12/2019 |
| CN | 111381431 A | 7/2020 |

* cited by examiner

METHOD FOR IMPLEMENTING SYNCHRONOUS RISING, FALLING, OR TRANSLATION OF PROJECTION IMAGE ALONG WITH ROLLABLE SCREEN

CROSS REFERENCE TO THE RELATED APPLICATIONS

This application is the national phase entry of International Application No. PCT/CN2020/114413, filed on Sep. 10, 2020, which is based upon and claims priority to Chinese Patent Application No. 202010392984.8, filed on May 11, 2020, the entire contents of which are incorporated herein by reference.

TECHNICAL FIELD

The present invention relates to the technical field of synchronous rising, falling, or translation of a projection image along with a rollable screen, particularly to a method for implementing the synchronous rising, falling, or translation of the projection image along with the movement of the rolling screen.

BACKGROUND

In general, there is no connection established between a traditional projector or an emerging projection TV (the following referred to as the projection host) and a screen displaying a projection image (the following referred to as a projection screen). The projection host and the projection screen are independent parts constituting a complete projection display system. In other words, the projection host does not control the rolling or unrolling of the projection screen. When the projection host is turned off or turned on, the projection screen will not act rolling or unrolling accordingly. In some specific cases, the suppliers or users of projection systems will develop some simple "projection host-projection screen" linkage system. For example, when the projection host is turned on, a control mechanism of the projection screen will receive specific instructions from the projection host and unroll the screen synchronously. When the projection host is turned off, the control mechanism of the projection screen will receive specific instructions from the projection host and roll up the screen synchronously. However, in the prior design solution, when the screen is rolled up or unrolled, the projection image can not strictly and synchronously move along with the screen, which leads to a bad user experience and significantly limits the systematic use of the projector. Therefore, it is desired to improve the technology to solve this problem in the prior art.

SUMMARY

The purpose of the present invention is to provide a method for implementing a synchronous rising, falling, or translation of a projection image along with the movement of a rollable screen. By designing a strict synchronous linkage system between a projection host and a rollable projection screen, the projection image can rise and fall synchronously or translate synchronously along with the movement of the rollable screen. The projection host can obtain a specific position of the projection screen in real-time. According to the real-time position information of the projection screen, the projection image is cut or compressed to achieve a visual effect of real-time rising, falling, or translation movement of the projection image along with the movement of the screen to solve the problems raised in the above background technology.

To achieve the above purposes, the present invention provides the following technical solution: a method for implementing a synchronous rising, falling, or translation of a projection image along with a movement of a rollable screen, including the following steps:

Step 1: after a system is powered on and started, first reporting, by a projection screen, a current position of a screen to a projection host via a communication link, denoting as a position n0.

Step 2: performing, by the projection host, a preprocessing on a projection image according to the current position n0 of the screen obtained from the projection screen. In the case of the first scene, in the vertical direction, a lower part of the image is cut off by the projection host to retain only an upper part. The width of a retained image remains unchanged, but the height changes to n0/T of the full image height. In the case of the second scene, the projection host does not change the aspect ratio of the image and proportionally compresses the width and height of an original image. At the current position n0 of the screen, the width and the height of the image are separately compressed to n0/T of the original image.

Step 3: projecting an image onto the projection screen after the projection host completes the preprocessing of the projection image.

Step 4: informing the projection screen, by the projection host, via the communication link to confirm that a current projection image is aligned according to the current position of the projection screen.

Step 5: driving the projection screen to the next position after the projection screen obtains confirmation information from the projection host, denoting it as a position n1.

Step 6: obtaining, by the projection host, the next specific position n1 of the projection screen via the communication link.

Step 7: repeating steps 2, 3, and 4.

Step 8: until the system is powered off, ending the operation.

Preferably, the type of light source and lens throw ratio of the projection host in step 1 is unlimited, and the light source type of the projection host can be any one of a laser light source or a LED light source; the lens throw ratio of the projection host can be any one of a long throw ratio, a short throw ratio, or an ultra-short throw ratio.

Preferably, the projection screen in step 1 is limited to a flexible rollable projection screen.

Preferably, the communication link in step 1 can be either a wired mode or a wireless mode; the wired mode includes an I2C bus, a UART bus, and a CAN bus; the wireless mode includes WIFI and Bluetooth.

Preferably, in the first scene of step 2, when the projection screen unrolls from bottom to top or rolls up from top to bottom, the width of the projection image remains unchanged, and the upper edge of the projection image always synchronously moves along with the upper edge of the screen. In the first scene, when the upper edge of the screen moves between position 0 and position T, the lower part of the projection image is cut off.

Preferably, in the second scene of step 2, when the projection screen unrolls from bottom to top or rolls up from top to bottom, the aspect ratio of the projection image remains unchanged, and the display area of the projection image zooms in along with the rising of the upper edge of the screen and zooms out along with the falling of the upper edge of the screen.

Compared with the prior art, the advantages of the present invention are the following:

In the method provided by the present invention, the "projection host" and "projection screen" are designed as a real linkage system, and the projection image can accurately move along with the specific position of the projection screen in real-time according to a preset way to achieve a perfect match between the projection image and the projection screen and achieve the best display effect.

DETAILED DESCRIPTION OF THE EMBODIMENTS

The technical solution in the embodiment of the present invention will be clearly and completely described below in conjunction with the drawings in the embodiments of the present invention. The embodiments described are only a part of the embodiment of the present invention and not the whole embodiment. Based on the embodiments in the present invention, all other embodiments obtained by those skilled in the art without creative labor fall within the scope of protection of the present invention.

Figure 1:
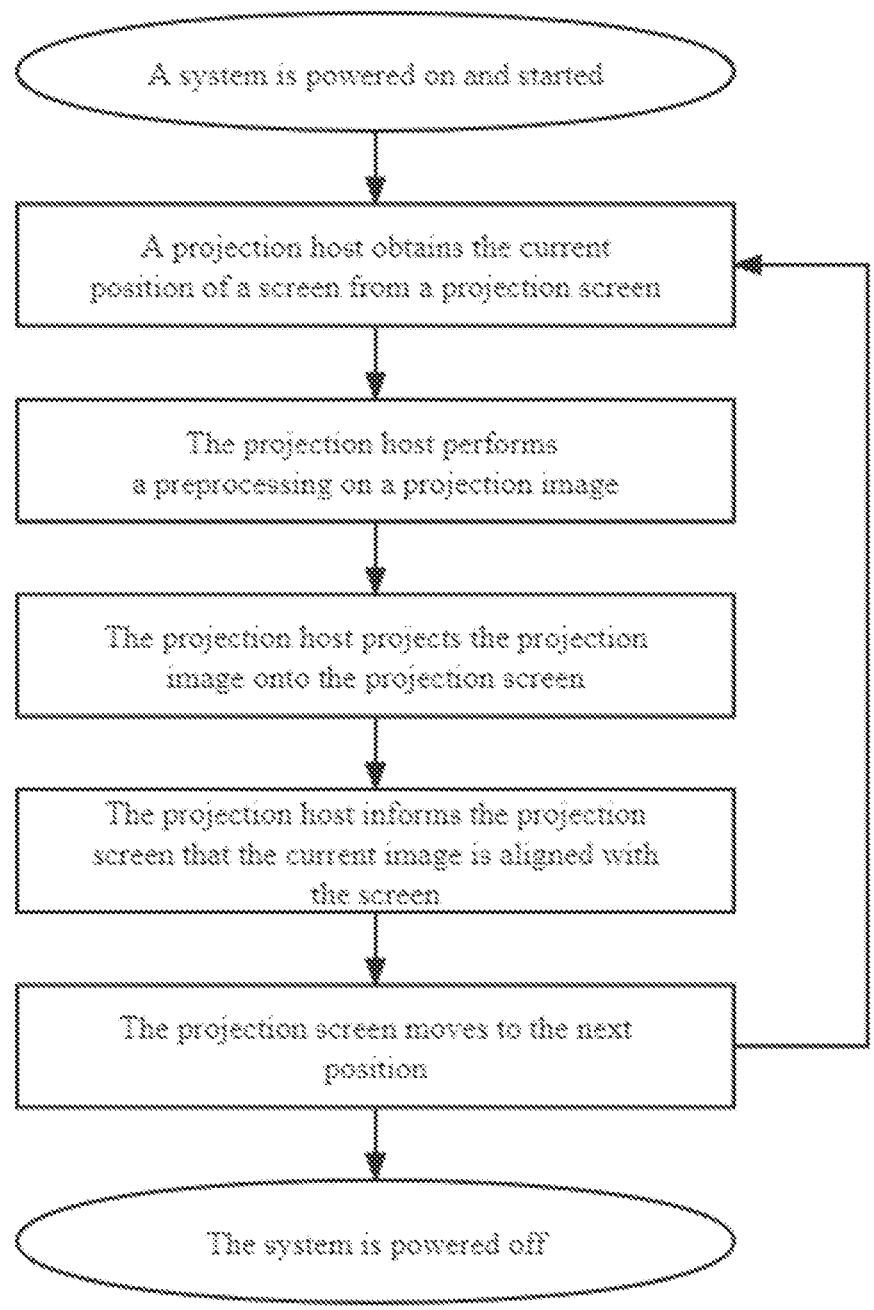
FIG. 1 is a schematic diagram of a flow chart of the present invention.

Referring to FIG. 1, the present invention provides a technical solution: a method for implementing a synchronous rising, falling, or translation of a projection image along with the movement of a rollable screen, including the following steps:

Step 1: After a system is powered on and started, a projection screen first reports the current position of a screen to a projection host via a communication link, denoted as the position n0.

Step 2: The projection host performs a preprocessing on a projection image according to the current position n0 of the screen obtained from the projection screen. In the case of the first scene, the projection host cuts off a lower part of the image in the vertical direction and retains only an upper part. The width of a retained image remains unchanged, but the height changes to n0/T of the full image height. In the case of the second scene, the projection host keeps the aspect ratio of the image unchanged, and an original image is proportionally compressed in the width and height directions of the image. At the current position n0 of the screen, the width and height of the image are separately compressed to n0/T of the original image.

Step 3: After the projection host completes the preprocessing of the projection image, an image is projected onto the projection screen.

Step 4: The projection host informs the projection screen via the communication link to confirm that a current projection image is aligned according to the current position of the projection screen.

Step 5: After the projection screen obtains confirmation information from the projection host, the projection screen is driven to reach the next position, denoted as the position n1.

Step 6: The projection host obtains the next specific position n1 of the projection screen via the communication link.

Step 7: Steps 2, 3, and 4 are repeated.

Step 8: Until the system is powered off, the operation ends.

The method described in the present invention is based on the following constraints:

(1) The present invention applies to a projection display system composed of the projection host and the rollable projection screen.

(2) The type of light source and lens throw ratio of the projection host is unlimited. The light source is a laser light source or an LED light source. The lens throw ratio is a long throw ratio, a short throw ratio, or an ultra-short throw ratio.

(3) For the convenience of description, the aspect ratio of a projection image of the projection host is assumed to be 16:9, and the physical resolution is assumed to be M×N. For example, usually, in a 2K resolution projection image, M=1920, N=1080, and in a 4K resolution projection image, M=3840, N=2160).

(4) The projection screen is limited to a flexible projection screen that can be rolled. There are two ways to install this screen: horizontal installation mode (the screen can be rolled up or unrolled in the vertical direction) and vertical installation mode (the screen can be rolled up or unrolled in the horizontal direction).

(5) If the projection screen adopts the horizontal installation mode, the screen can only be rolled up or unrolled vertically and fixed in the other two dimensions (such as left and right, front and back). If the projection screen adopts the vertical installation mode, the screen can only be rolled up or unrolled horizontally and fixed in the other two dimensions (such as up and down, front and back).

(6) To implement the rolling or unrolling of the screen, in addition to a screen, the rollable projection screen further includes a screen rolling mechanism composed of electronic components and structural components. For the convenience of description, when describing the specific method of the present invention, the rollable projection screen system composed of the screen and the rolling mechanism is referred to as a projection screen.

(7) The initial relative position of the projection host and the projection screen must be adjusted and aligned in advance.

Figure 2:
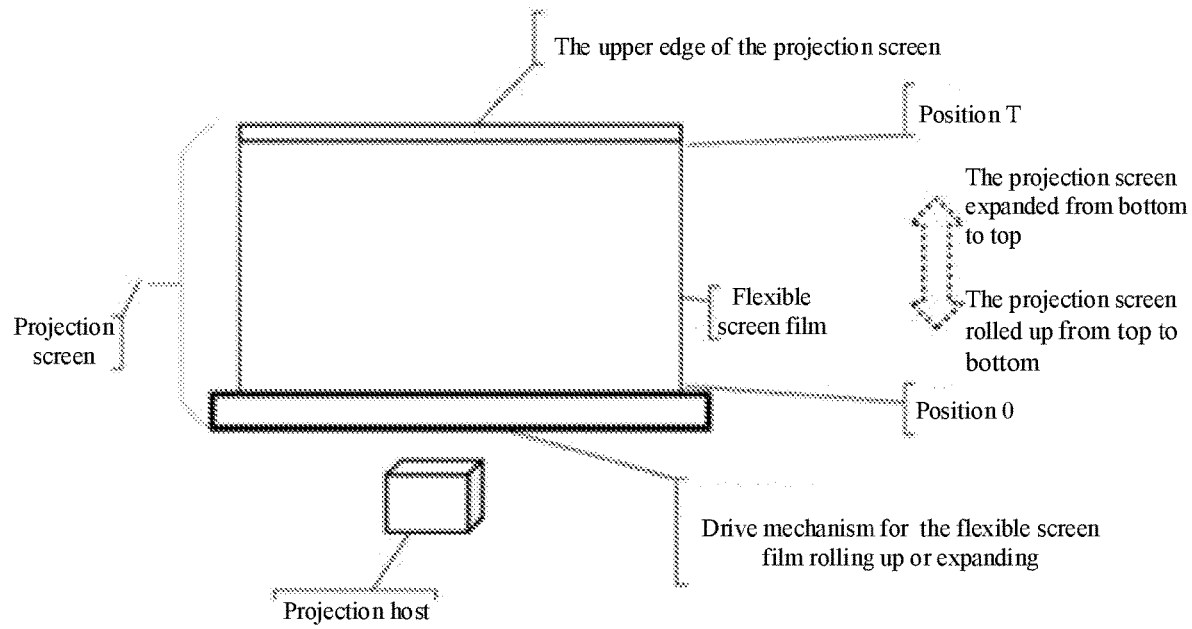
FIG. 2 is a schematic diagram of a projection screen installation structure (a horizontal installation state of the projection screen) based on the present invention.

(8) For the convenience of description, when describing the specific method of the present invention, the projection screen is assumed to adopt the "horizontal installation mode," as shown in FIG. 2.

In the method of the present invention, the projection host and the projection screen are connected via a stable communication link, and the two can exchange state information and control information in real-time quickly. The communication link between the projection host and the projection screen is wired (for example, an I2C bus, a UART bus, and a CAN bus) or wireless (for example, WIFI, Bluetooth).

The information transmitted via the stable communication link between the projection host and the projection screen should contain at least the following parts:

(1) Real-time position information of the rollable projection screen. Assuming that the rollable projection screen adopts the horizontal installation mode, the screen can be unrolled from bottom to top and rolled up from top to bottom (see FIG. 2). Assuming that the current projection screen is fully rolled up, the position of the upper edge of the screen is marked as 0; after the screen is fully unrolled, a position of the upper edge of the screen is marked as T. The upper edge of the screen can be moved between position 0 and position T. In this method, the distance between position 0 and position T is evenly divided into n equal parts; that is, when the upper edge of the screen moves from position 0 to position T, a motion step is T/n, where 0<n≤N. N is a vertical physical resolution of the projection image. For example, if the physical resolution of the projection image is 1920× 1080, then N is equal to 1080, that is, the motion step of the screen does not exceed the height of a projection pixel. When the screen is unrolled from position 0 and moves to the first step, the projection screen transmits the current position information to the projection host via the communication link, and the current position is marked as position 1. When the screen moves to the second step, the projection screen transmits the current position information to the projection host via the communication link, and the current position is marked as position 2, and so on. The projection screen can move to a random position n between position 0 and position T and stop at position n. The projection host can obtain the position n of the projection screen in real-time via the communication link.

(2) Real-time status information of the rollable projection screen. In addition to the real-time position information of the projection screen mentioned above, the projection screen also has other status information that needs to be transmitted to the projection host in real-time. This status information includes, but is not limited to, various error information (such as failure of a mechanical structure for screen rolling) and temperature information (such as the projection host needs to monitor the temperature of a drive motor for the screen rolling to prevent failure caused by the excessively high temperature of the motor).

After the projection host obtains the specific position information from the projection screen in real-time, an image signal needs to be calculated according to the position information of the screen, and then the projection image is compressed, stretched, or cut to adjust the projection image in real-time according to the specific position of the screen to obtain the visual effect of the projection image synchronously rising, falling or translating along with the movement of the rollable screen.

Figure 3:
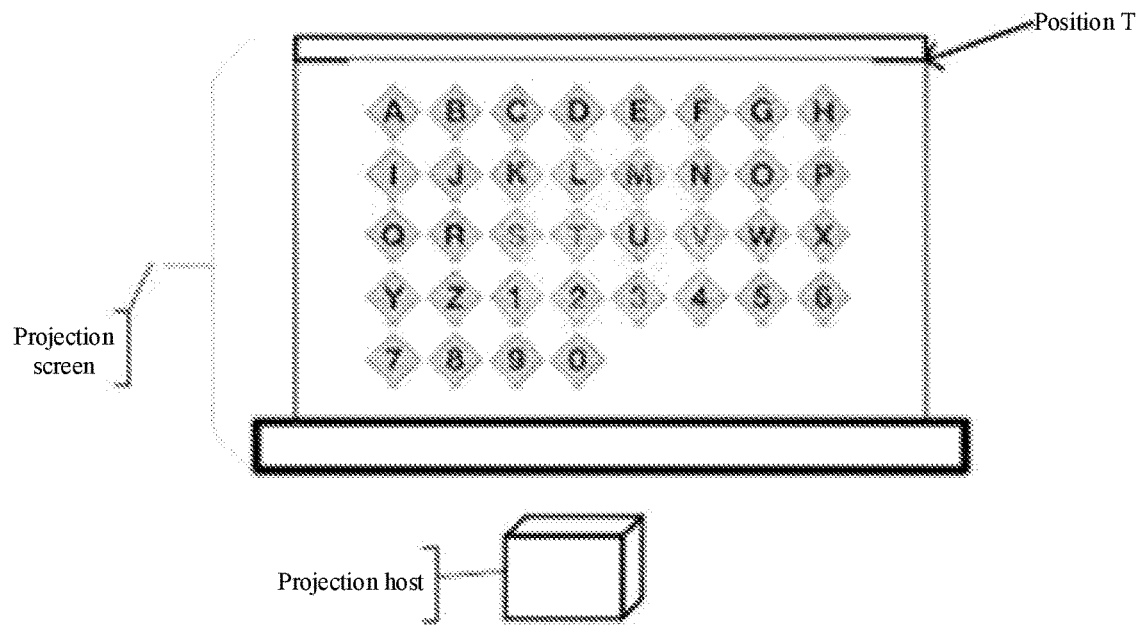
FIG. 3 is a schematic diagram of a state when a screen is fully unrolled, the upper edge of the screen is at position T, and an image occupies the whole screen.
Figure 4:
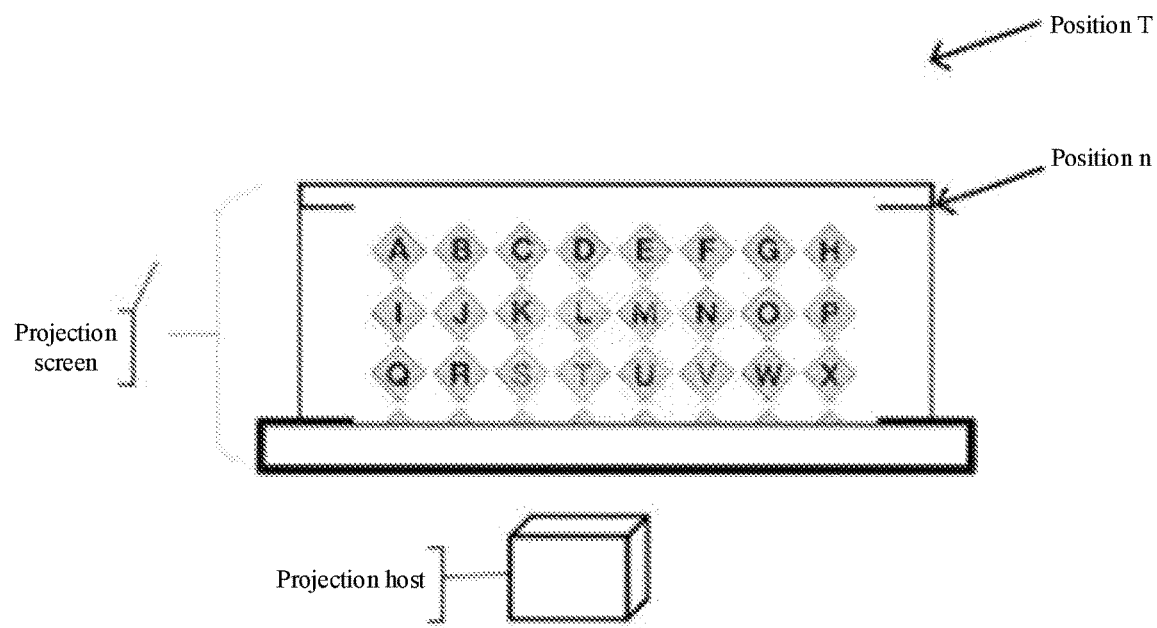
FIG. 4 is a schematic diagram of a state when part of the screen is rolled up, the upper edge of the screen is at position n, and the lower part of the image is cut off.

To more clearly explain the "visual effect of the projection image synchronously rising, falling or translating along with the movement of the rollable screen", two typical scenes are provided (note: the actual use scenes are not limited to the following two scenes):

The first scene: When the projection screen unrolls from the bottom to top or rolls up from top to bottom, the width of the projection image remains unchanged, and the upper edge of the projection image always synchronously moves along with the upper edge of the screen. In this scene, when the upper edge of the screen moves between position 0 and position T, the lower part of the projection image is cut off, as shown in FIGS. 3 and 4.

Figure 5:
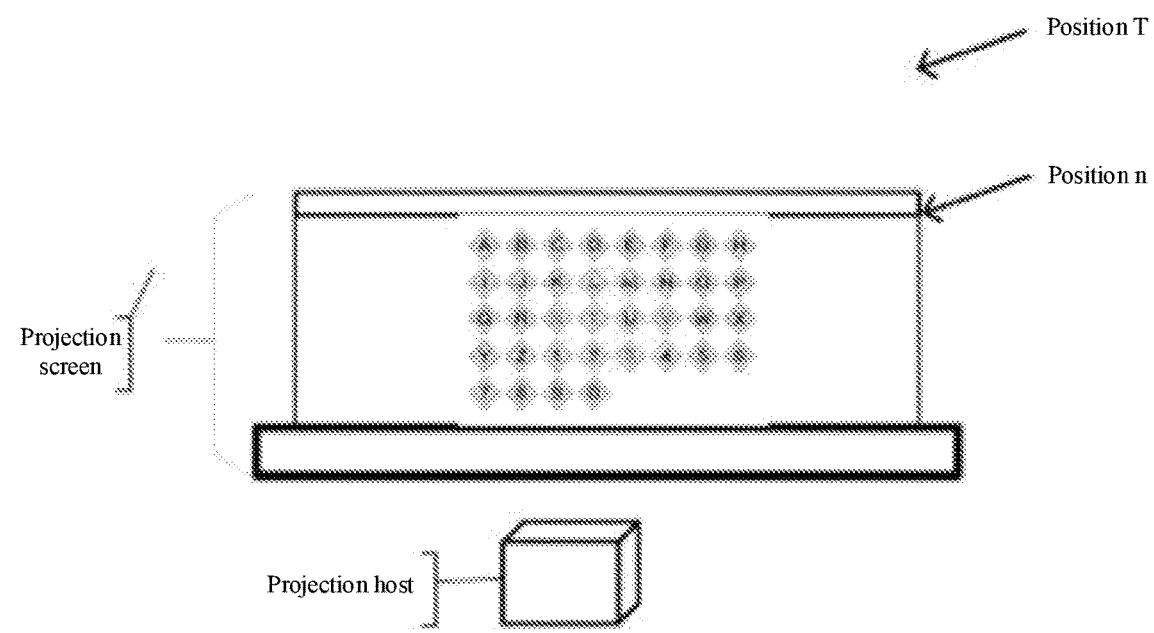
FIG. 5 is a schematic diagram of a state when the screen is partly unrolled, the upper edge of the screen is at position n, and the image is compressed proportionally in both width and height directions.

The second scene: When the projection screen unrolls from the bottom to top or rolls up from top to bottom, the aspect ratio of the projection image remains unchanged, and the display area of the projection image zooms in along with the rising of the upper edge of the screen and zooms out along with the falling of the upper edge of the screen; that is, the whole image will be displayed within the range of the screen, and no part will not be cut off, as shown in FIG. 5.

Additional notes: As mentioned above, the projection host needs to preprocess the projection image before projecting it onto the projection screen. Nowadays, some mature algorithms and chips can support the preprocessing of the projection image. These mature algorithms are not the core content of the present invention and will not be repeated here.

The present invention relates to a basic method for implementing the synchronous rising, falling, or translation of the projection screen along with the movement of a rollable screen. In the specific productization process, the suppliers of the projection display system can make deletions or minor modifications (for example, introducing some non-critical parameters) according to the basic method provided by the present invention and then produce a projection display product that can realize the function of the projection image following the movement of the projection screen. Such deletion or minor modifications of the method of the present invention is within the scope of claims of the present invention.

Although embodiments of the present invention have been shown and described, for those skilled in the art, it is understood that a variety of changes, modifications, replacements, and variants can be made to these embodiments without departing from the principle and spirit of the present invention, and the attached claims and their equivalents limit the scope of the present invention.

What is claimed is:

1. A method for implementing a synchronous rising, falling, or translation of a projection image along with a movement of a projection screen, comprising the following steps:
   step 1: after a system is powered on and started, first reporting, by the projection screen, a current position of the projection screen to a projection host via a communication link, denoting the current position of the projection screen as a position n0;
   step 2: performing, by the projection host, a preprocessing on a projection image to obtain a preprocessed image according to the current position n0 of the projection screen obtained from the projection screen; in the case of a first scene, a lower part of the projection image is cut off in a vertical direction by the projection host and retaining only an upper part, a width of a retained image remains unchanged, and a height of the retained image changes to n0/T of a full image height, wherein T refers to a position of an upper edge of the projection screen when the projection screen is fully roller up; in the case of a second scene, the projection host does not change an aspect ratio of the projection image and proportionally compresses a width and a height of an original image; at the current position n0 of the projection screen, the width and the height of the projection image are separately compressed to n0/T of the original image;
   step 3: projecting the preprocessed image onto the projection screen after the projection host completes the preprocessing of the projection image;
   step 4: informing the projection screen, by the projection host, via the communication link to confirm that a current projection image is aligned according to the current position of the projection screen;
   step 5: driving the projection screen to a next position after the projection screen obtains confirmation information from the projection host, denoting the next position of the projection screen as a position n1;

step 6: the projection host obtains the next position n1 of the projection screen via the communication link;

step 7: repeating steps 2, 3, and 4; and step 8: until the system is powered off, ending an operation.

2. The method according to claim 1, wherein a type of light source and a lens throw ratio of the projection host in step 1 is unlimited, and the type of light source of the projection host is one selected from a laser light source and a LED light source; the lens throw ratio of the projection host is one selected from a long throw ratio, a short throw ratio, and an ultra-short throw ratio.

3. The method according to claim 1, wherein the projection screen in step 1 is a rollable flexible projection screen.

4. The method according to claim 1, wherein the communication link in step 1 is a wired mode or a wireless mode; the wired mode includes an I2C bus, a UART bus, and a CAN bus; the wireless mode includes WIFI and Bluetooth.

5. The method according to claim 1, wherein in the first scene of step 2, when the projection screen unrolls from bottom to top or rolls up from top to bottom, the width of the retained image remains unchanged, and an upper edge of the projection image always synchronously moves along with an upper edge of the projection screen; in the first scene, when the upper edge of the projection screen moves between a position 0 and the position T, the lower part of the projection image is cut off.

6. The method according to claim 1, wherein in the second scene of step 2, when the projection screen unrolls from bottom to top or rolls up from top to bottom, the aspect ratio of the projection image remains unchanged, and a display area of the projection image zooms in along with rising of an upper edge of the projection screen and zooms out along with descending of the upper edge of the projection screen.

\* \* \* \* \*